United States Patent
Okawa et al.

(10) Patent No.: US 8,065,496 B2
(45) Date of Patent: Nov. 22, 2011

(54) METHOD FOR UPDATING INFORMATION USED FOR SELECTING CANDIDATE IN LRU CONTROL

(75) Inventors: Tomoyuki Okawa, Kawasaki (JP); Hiroyuki Kojima, Kawasaki (JP); Masaki Ukai, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 542 days.

(21) Appl. No.: 12/230,329

(22) Filed: Aug. 27, 2008

(65) Prior Publication Data

US 2008/0320256 A1 Dec. 25, 2008

Related U.S. Application Data

(63) Continuation of application No. PCT/JP2006/303620, filed on Feb. 27, 2006.

(51) Int. Cl.
*G06F 12/00* (2006.01)
(52) U.S. Cl. ......... 711/160; 711/136; 711/144; 711/145
(58) Field of Classification Search .................. 711/160, 711/136, 144, 145
See application file for complete search history.

(56) References Cited

U.S. PATENT DOCUMENTS

| | | | |
|---|---|---|---|
| 4,507,729 A | 3/1985 | Takahashi et al. | |
| 5,140,690 A | 8/1992 | Hata et al. | |
| 5,249,286 A * | 9/1993 | Alpert et al. | 711/125 |
| 5,353,425 A * | 10/1994 | Malamy et al. | 711/144 |
| 5,640,339 A | 6/1997 | Davis et al. | |
| 6,134,636 A * | 10/2000 | Mathews et al. | 711/163 |
| 6,490,666 B1 * | 12/2002 | Cabrera et al. | 711/161 |
| 6,584,547 B2 * | 6/2003 | Palanca et al. | 711/133 |
| 2003/0079087 A1 * | 4/2003 | Kuwata | 711/136 |
| 2007/0118695 A1 * | 5/2007 | Lowe et al. | 711/136 |

FOREIGN PATENT DOCUMENTS

| | | |
|---|---|---|
| JP | 58-45682 | 3/1983 |
| JP | 63-163649 | 7/1988 |
| JP | 1-154265 | 6/1989 |
| JP | 1-314359 | 12/1989 |
| JP | 2-64832 | 3/1990 |
| JP | 6-332801 | 12/1994 |
| JP | 9-288617 | 11/1997 |
| JP | 11-338775 | 12/1999 |

OTHER PUBLICATIONS

Japanese Office Action issued on Apr. 7, 2009 in corresponding Japanese Patent Application 2008-501578.
International Search Report mailed Jun. 27, 2006 in connection with International Application No. PCT/JP2006/303620.

* cited by examiner

*Primary Examiner* — Hong Kim
(74) *Attorney, Agent, or Firm* — Fujitsu Patent Center

(57) ABSTRACT

To reduce the number of bits required for LRU control when the number of target entries is large, and achieve complete LRU control. Each time an entry is used, an ID of the used entry is stored to configure LRU information so that storage data 0 stored in the leftmost position indicates an ID of an entry with the oldest last use time (that is, LRU entry), for example as shown in FIG. 1(1). An LRU control apparatus according to a first embodiment of the present invention refers to the LRU information, and selects an entry corresponding to the storage data 0 (for example, entry 1) from the LRU information as a candidate for the LRU control, based on the storage data 0 as the ID of the entry with the oldest last use time.

4 Claims, 16 Drawing Sheets

FIG.3

| Index | ←LRU | | | | | | | | | | | | | | | MRU→ |
|---|---|---|---|---|---|---|---|---|---|---|---|---|---|---|---|---|
| | 1st | 2nd | 3rd | 4th | 5th | 6th | 7th | 8th | 9th | 10th | 11th | 12th | 13th | 14th | 15th | 16th |
| 0 | 0000 | 0001 | 0010 | 0011 | 0100 | 0101 | 0110 | 0111 | 1000 | 1001 | 1010 | 1011 | 1100 | 1101 | 1110 | 1111 |
| ... | | | | | | | | | | | | | | | | |
| Z-1 | 0000 | 0001 | 0010 | 0011 | 0100 | 0101 | 0110 | 0111 | 1000 | 1001 | 1010 | 1011 | 1100 | 1101 | 1110 | 1111 |

FIG.4

| Index Z | 1st | 2nd | 3rd | 4th | 5th | 6th | 7th | 8th | 9th | 10th | 11th | 12th | 13th | 14th | 15th | 16th |
|---|---|---|---|---|---|---|---|---|---|---|---|---|---|---|---|---|
| | C | 2 | 5 | 1 | B | A | 7 | F | 9 | 0 | 3 | E | 4 | D | 8 | 6 |

←LRU  MRU→

FIG.5

|     | 1st | 2nd | 3rd | 4th | 5th | 6th | 7th | 8th | 9th | 10th | 11th | 12th | 13th | 14th | 15th | 16th |
|-----|-----|-----|-----|-----|-----|-----|-----|-----|-----|------|------|------|------|------|------|------|
| (a) | C   | 2   | 5   | 1   | B   | A   | 7   | F   | 9   | 0    | 3    | E    | 4    | D    | 8    | 6    |
| (b) | C   | 5   | 1   | B   | A   | 7   | F   | 9   | 0   | 3    | E    | 4    | D    | 8    | 6    | 2    |

←LRU　　　　　　　　　　　　　　　　　　　　MRU→

FIG.8

| ENTRY | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | 1 | 1 | 0 | 0 | 0 | 1 | 1 | 0 | 0 | 1 | 0 | 1 | 1 | 0 | 0 | 1 |

FIG.12

| ←LRU | | | | | | | | | | | | | | | MRU→ |
|---|---|---|---|---|---|---|---|---|---|---|---|---|---|---|---|
| 1st | 2nd | 3rd | 4th | 5th | 6th | 7th | 8th | 9th | 10th | 11th | 12th | 13th | 14th | 15th | 16th |
| C | 6 | 5 | 1 | B | 6 | F | F | 9 | 0 | 1 | C | 5 | B | 9 | 6 |

FIG.15

| BIT | 0 | 1 | 2 | 3 | 4 | 5 |
|---|---|---|---|---|---|---|
| REPRESENTING THAT WHEN VALUE IS 0 | Entry 1 < Entry 0 | Entry 2 < Entry 0 | Entry 3 < Entry 0 | Entry 2 < Entry 1 | Entry 3 < Entry 1 | Entry 3 < Entry 2 |
| WHEN VALUE IS 1 | Entry 1 > Entry 0 | Entry 2 > Entry 0 | Entry 3 > Entry 0 | Entry 2 > Entry 1 | Entry 3 > Entry 1 | Entry 3 > Entry 2 |

FIG.16

P_LRU_ENTRY [0] = ~ (P_LRU [0] & M_DELETE_ENTRY [1]) &
~ (P_LRU [1] & M_DELETE_ENTRY [2]) &
~ (P_LRU [2] & M_DELETE_ENTRY [3]) &
M_DELETE_ENTRY [0]

P_LRU_ENTRY [1] = ~ (M_LRU [0] & M_DELETE_ENTRY [0]) &
~ (P_LRU [3] & M_DELETE_ENTRY [2]) &
~ (P_LRU [4] & M_DELETE_ENTRY [3]) &
M_DELETE_ENTRY [1]

P_LRU_ENTRY [2] = ~ (M_LRU [1] & M_DELETE_ENTRY [0]) &
~ (M_LRU [3] & M_DELETE_ENTRY [1]) &
~ (P_LRU [5] & M_DELETE_ENTRY [3]) &
M_DELETE_ENTRY [2]

P_LRU_ENTRY [3] = ~ (M_LRU [2] & M_DELETE_ENTRY [0]) &
~ (M_LRU [4] & M_DELETE_ENTRY [1]) &
~ (M_LRU [5] & M_DELETE_ENTRY [2]) &
M_DELETE_ENTRY [3]

FIG.17

|     | NUMBER OF ENTRIES | NUMBER OF BITS REQUIRED FOR CONTROL |
|-----|-------------------|-------------------------------------|
| (a) | 2 ENTRIES ×8 ENTRIES | $_2C_2 + {_8}C_2 = 29$ |
| (b) | 4 ENTRIES ×4 ENTRIES | $_4C_2 + {_4}C_2 = 12$ |
| (c) | 8 ENTRIES ×2 ENTRIES | $_8C_2 + {_2}C_2 = 29$ |

METHOD FOR UPDATING INFORMATION USED FOR SELECTING CANDIDATE IN LRU CONTROL

This application is a continuing application, filed under 35 U.S.C. §111(a), of International Application PCT/JP2006/303620, filed Feb. 27, 2006, the disclosure of which is incorporated herein by reference.

BACKGROUND OF THE INVENTION

1. Field of the Invention

The present invention relates to an LRU control apparatus, an LRU control method, and a computer-readable recording medium for selecting an entry to be subjected to LRU control from a plurality of entries included in a storage device.

2. Description of the Related Art

Typically, an LRU (Least Recently Used) control method, which is one of replacement algorithms, is applied to a storage device (such as a main memory and a cache) of an apparatus that performs arithmetic operations according to predetermined programs (such as a general-purpose computer, a supercomputer, and a server) (for example, see Japanese Patent Application Laid-open No. H09-288617). More specifically, the LRU control method is characterized in that histories of how each data is referred in a main memory are retained, and that data that is most unlikely to be referred to hereafter by a CPU (Central Processing Unit) is paged out from the main memory based on the histories. This method intends to avoid a decrease in a processing efficiency caused by an increase in an input/output frequency when data paged out from the main memory is referred to again by the CPU.

For example, conventional LRU control performed when the number of target entries (ways) is four is briefly explained with reference to FIGS. 15 and 16. FIG. 15 depicts what are represented by six bits required for the LRU control over four entries (the entries are denoted as Entries 0, 1, 2, and 3, and A>B represents that A was more recently used). FIG. 16 depicts logic of the LRU control (P_ represents positive, M_ represents negative, "~" represents NOT, "&" represents AND, and "|" represents OR, and for example a signal of an LRU bit "0" is expressed as P_LRU[0], and a signal of an Entry 0 that cannot be used or selected is expressed as P_DELETE_ENTRY[0]). When a signal of information composed of six bits as shown in FIG. 15 is received and then the signal is applied to the logic as shown in FIG. 16, an entry that was least recently used can be determined.

For example, as shown in FIG. 17(b), Quasi-LRU control that is multi-staged LRU control can reduce the number of bits required when the number of entries is 16, as compared to the LRU control.

In the conventional technique, however, practical control is difficult to perform when the number of entries that are subjected to the LRU control is large, as will be described below. In the quasi-LRU control as the multi-staged LRU control, results of the LRU control may be biased.

That is, it is practical that the conventional LRU control is performed for about four target entries. If the number of target entries is set at 16, the number of required bits becomes 120. Thus, circuit implementation becomes complicated, so that practical control becomes difficult to perform.

Further, in the quasi-LRU control as the multi-staged LRU control, when control is performed with an external entry-unusable/unselectable signal as shown in FIG. 12, there is a concern that results of the LRU control may be biased toward certain entries (or group of lower entries) in some ways of designating unusable or unselectable entries.

SUMMARY

It is an object of the present invention to at least partially solve the problems in the conventional technology.

An LRU control apparatus according to one aspect of the present invention selects an entry to be subjected to an LRU control from plural entries provided in a storage device. The LRU control apparatus includes an LRU-information storage unit, an LRU-information update unit, and an LRU-control candidate selecting unit. The LRU-information storage unit arranges identification information identifying each of the entries in order of last use time beginning from an entry having an oldest last use time, and stores the arranged identification information as LRU information. When any of the entries is used, the LRU-information update unit extracts identification information of the used entry from each of the identification information stored in the LRU-information storage unit, and updates the LRU information by moving the identification information of the used entry to a rearmost position. The LRU-control-candidate selecting unit selects a candidate to be subjected to the LRU control from the entries by referring to the LRU information stored in the LRU-information storage unit.

A computer program product having a computer readable medium including programmed instructions for controlling an LRU control apparatus that selects an entry to be subjected to an LRU control from plural entries provided in a storage device, wherein the instructions, when executed by a computer, causes the computer to perform: arranging identification information identifying each of the entries in order of last use time beginning from an entry having an oldest last use time; storing the arranged identification information as LRU information; extracting, when any of the entries is used, identification information of the used entry from each of the identification information stored by the storing; updating the LRU information by moving the identification information of the used entry to a rearmost position; and selecting a candidate to be subjected to the LRU control from the entries by referring to the LRU information stored by the storing.

An LRU control method that selects an entry to be subjected to an LRU control from plural entries provided in a storage device, includes: arranging identification information identifying each of the entries in order of last use time beginning from an entry having an oldest last use time; storing the arranged identification information as LRU information; extracting, when any of the entries is used, identification information of the used entry from each of the identification information stored by the storing; updating the LRU information by moving the identification information of the used entry to a rearmost position; and selecting a candidate to be subjected to the LRU control from the entries by referring to the LRU information stored by the storing. The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an example of a configuration of LRU for 16 entries;

FIG. 4 is an example of LRU information in an arbitrary index;

FIG. 5 depicts transition of the LRU information by updating;

FIG. 8 is an example of selectability information;

FIG. 12 is another example of erroneous LRU information;

FIG. 15 is an example of conventional LRU for four entries;

FIG. 16 depicts how to determine an LRU entry according to the conventional technique; and FIG. 17 is an example of a two-stage quasi-LRU for 16 entries.

DETAILED DESCRIPTION OF THE PREFERRED EMBODIMENTS

Exemplary embodiments of an LRU control apparatus, an LRU control method, and an LRU control program according to the present invention is explained below in detail with reference to the accompanying drawings. An LRU control apparatus according to a first embodiment is explained hereinafter, and then other embodiments of the present invention are explained.

An outline and characteristics of the LRU control apparatus according to a first embodiment, a configuration of the LRU control apparatus, and a flow of a process performed by the LRU control apparatus are successively explained, and then an effect of the first embodiment is explained.

Figure 1:
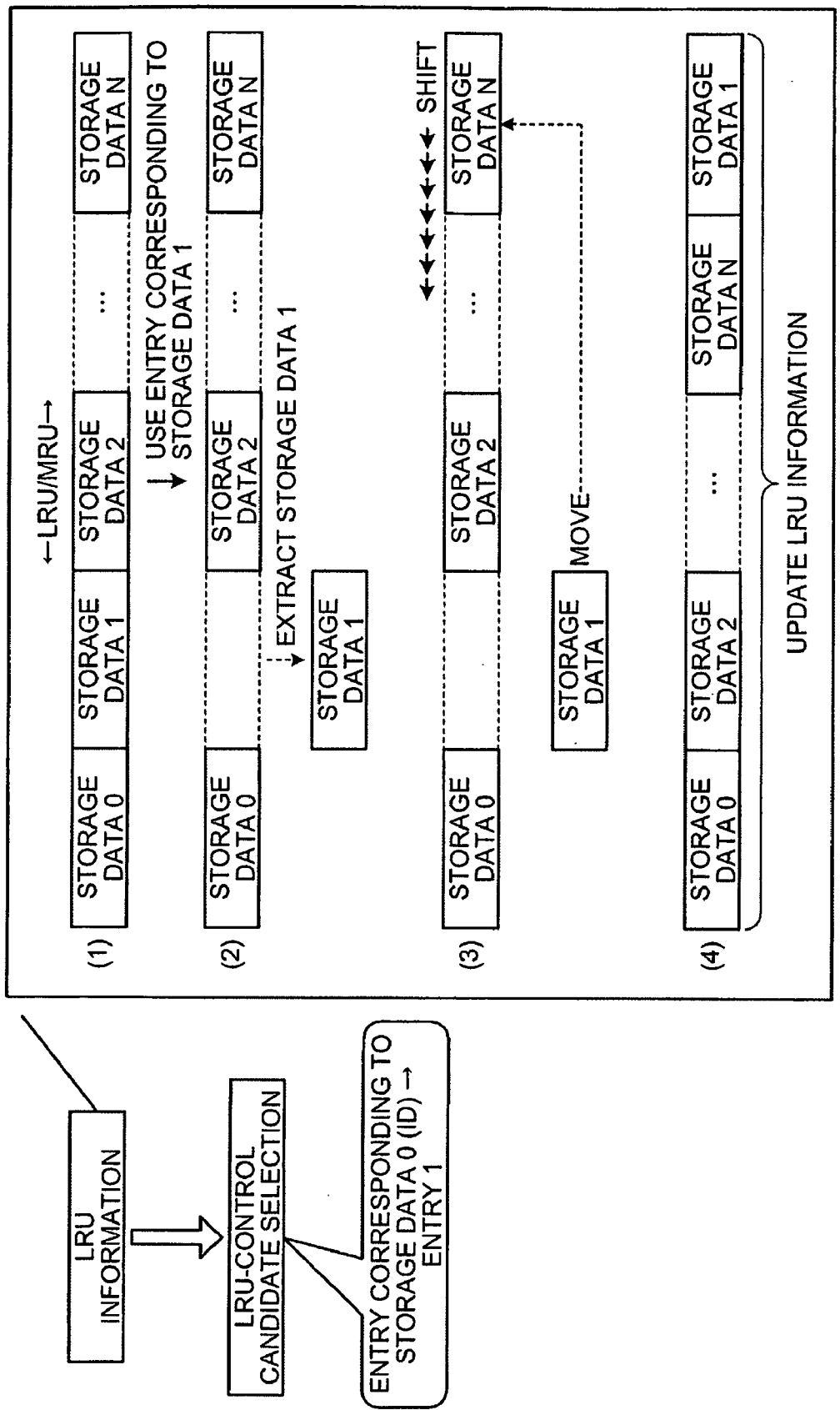
FIG. 1 is an explanatory diagram of an outline of an LRU control apparatus according to a first embodiment.

The outline and characteristics of the LRU control apparatus according to the first embodiment are explained with reference to FIG. 1. FIG. 1 is an explanatory diagram of the outline of the LRU control apparatus according to the first embodiment. As shown in FIG. 1, the LRU control apparatus according to the first embodiment generally selects an entry to be subjected to LRU control (an Least Recently Used entry, that is, data included in an entry having an oldest last use is paged out) from plural entries included in a storage device (such as a main memory, a cache memory, and a random access memory (RAM)). The LRU control apparatus is mainly characterized in that it reduces the number of bits required for the LRU control when the number of target entries is large, and further characterized in achieving complete LRU control.

The main characteristics are specifically explained. The LRU control apparatus according to the first embodiment stores therein identification information identifying each of plural entries (for example, IDs each being uniquely assigned to each entry). As shown in FIG. 1(1), for example, the identification information (for example, IDs) of the entries is arranged and stored in order of last use time so as to form LRU information. Here, storage data 0 stored in the leftmost position indicates an ID of an entry having the oldest last use time (that is, LRU entry), and storage data N stored in the rightmost position indicates an ID of an entry having the newest last use time (that is, Most Recently Used (MRU) entry).

The LRU control apparatus according to the first embodiment refers to the LRU information, and, based on the storage data 0 indicating the ID of the entry with the oldest last use time, selects the entry corresponding to the storage data 0 (for example, entry 1) from the LRU information as a candidate for the LRU control.

Further, the LRU control apparatus according to the first embodiment updates the LRU information according to uses of the entries to configure the LRU information so that the LRU control apparatus can always understand an entry with the oldest last use time. More specifically, for example when the LRU information includes storage data 1 as identification information of an entry that stores therein data corresponding to an access request, and thus the LRU information needs to be updated, the LRU control apparatus according to the first embodiment extracts the storage data 1 from the LRU information (see FIG. 1(2)). The LRU control apparatus according to the first embodiment then shifts storage data 2 to storage data N indicating IDs of entries having newer last use times than that of the storage data 1 to the left, and moves the storage data 1 to a MRU position created by the shifting (see FIG. 1(3)). In this way, the LRU control apparatus according to the first embodiment completes the update of the LRU information (see FIG. 1(4)).

Thus, the LRU control apparatus according to the first embodiment can reduce the number of bits required for the LRU control when the number of target entries is large, and can achieve complete LRU control as the main characteristics mentioned above.

Figure 2:
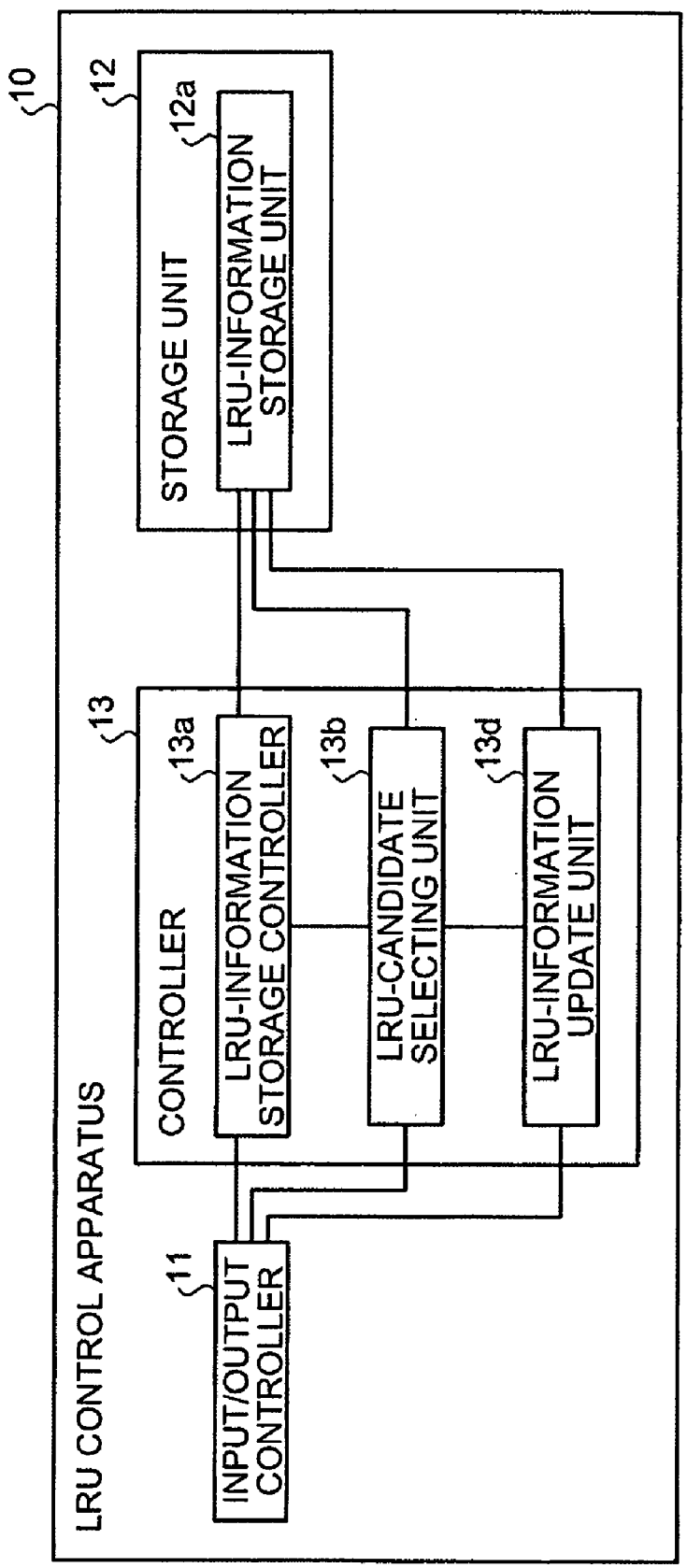
FIG. 2 is a block diagram of a configuration of the LRU control apparatus according to the first embodiment.

A configuration of the LRU control apparatus according to the first embodiment is explained with reference to FIG. 2. FIG. 2 is a block diagram of a configuration of the LRU control apparatus according to the first embodiment. In FIG. 2, only processing units required to realize the LRU control apparatus according to the first embodiment are shown, and other processing units are omitted.

As shown in FIG. 2, an LRU control apparatus 10 according to the first embodiment includes an input/output controller 11, a storage unit 12, and a controller 13. The input/output controller 11 controls input and output of various kinds of information. For example, the input/output controller 11 controls input of identification information (for example, ID) of a used entry (entry associated with update), and output of identification information (for example, ID) of an entry that is selected by an LRU-candidate selecting unit 13b (which is explained later) as a candidate for the LRU control to an external module.

The storage unit 12 stores data and programs required for various processes performed by the controller 13. The storage unit 12 particularly includes an LRU-information storage unit 12a, as a unit closely related to the present invention. When the LRU information includes for example 16 entries, the LRU-information storage unit 12a stores identification information (for example, IDs) of 16 target entries as candidates for the LRU control, in order of the last use time beginning from a 1st candidate with the oldest last use time to a 16th candidate, being encoded with four bits (for example, 0000 to 1111) as shown in FIG. 3.

The controller 13 has an internal memory that stores therein predetermined control programs, programs specifying various process procedures, and required data, and based thereon, performs various processes. The controller 13 particularly includes an LRU-information storage controller 13a, the LRU-candidate selecting unit 13b, and an LRU-information update unit 13d, as units closely related to the present invention.

The LRU-information storage controller 13a stores the LRU information in the LRU-information storage unit 12a. More specifically, for example, the LRU-information storage controller 13a stores identification information (for example, ID) of a used entry (entry associated with update) received from the input/output controller 11, in a predetermined storage position in the LRU-information storage unit 12a.

The LRU-candidate selecting unit 13b selects a candidate to be subjected to the LRU control. More specifically, when LRU information read from the LRU-information storage unit 12a does not include identification information (for example, ID) of an entry that stores data corresponding to an access request, the LRU-candidate selecting unit 13b selects an entry corresponding to identification information (for example, ID) of an entry having the oldest last use time, as a candidate for the LRU control. The LRU-candidate selecting unit 13b outputs the identification information (for example, ID) of the entry selected as the candidate for the LRU control via the input/output controller 11 to an external module, for example.

The LRU-information update unit 13d updates the LRU information stored in the LRU-information storage unit 12a. More specifically, for example, the LRU-information update unit 13d updates the LRU information when the LRU information includes identification information (for example, ID) of an entry that stores data corresponding to the access request. As shown in FIG. 5, for example, when the LRU information includes identification information of an entry 2 that stores data corresponding to the access request, the LRU-information update unit 13d extracts the identification information (for example, information expressed in one of hexadecimal numbers from 0 to F, see FIG. 4) of the entry 2 from a 2nd storage position in an arbitrary index (for example, Z) of the LRU information stored in the LRU-information storage unit 12a. The LRU-information update unit 13d then successively shifts data (for example, IDs of the entries) stored in 3rd to 16th storage positions to the left, and stores the entry identification information corresponding to the entry 2 extracted from the 2nd storage position into the emptied 16th storage position, thereby updating the LRU information (see FIGS. 5(a) and 5(b)).

Figure 6:
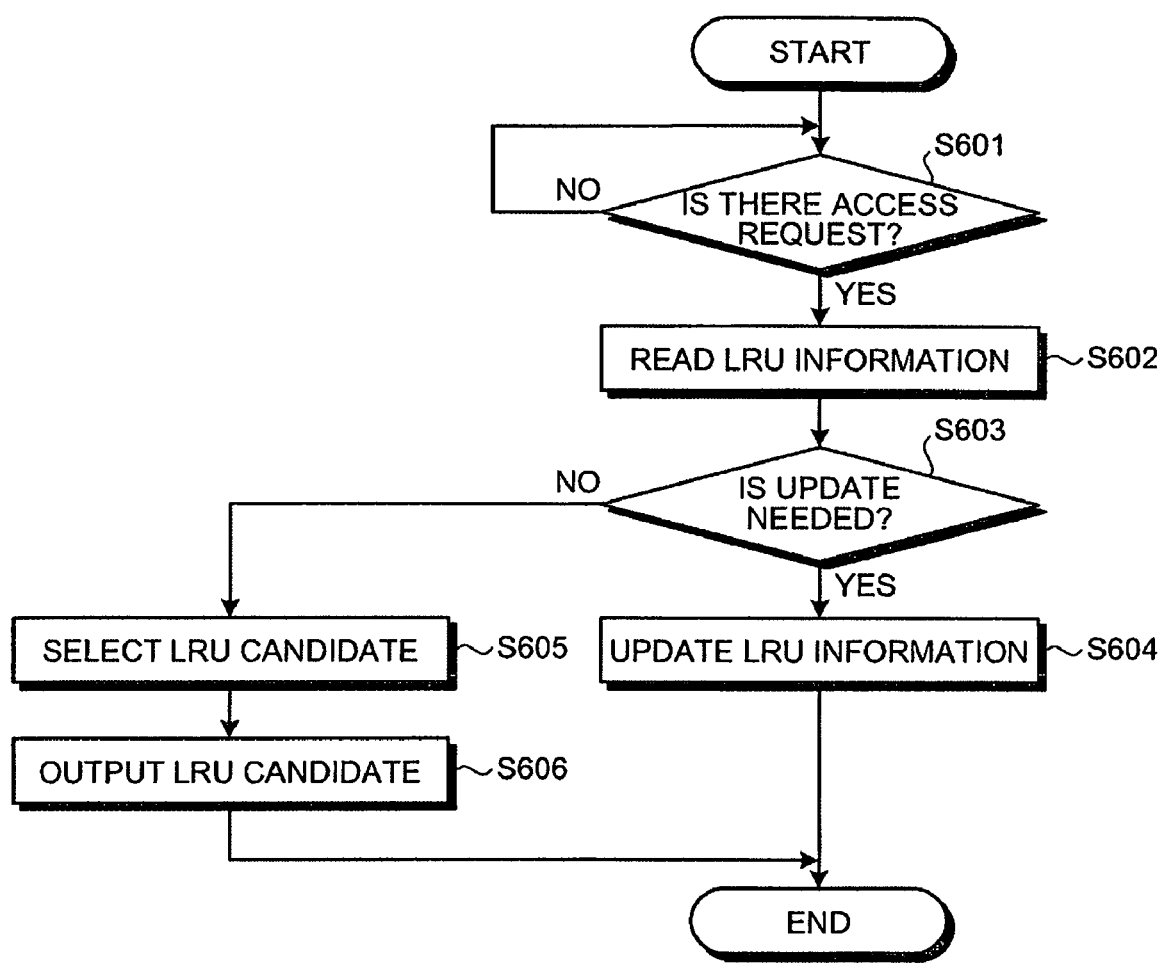
FIG. 6 is a flowchart of a process performed by the LRU control apparatus according to the first embodiment.

A process performed by the LRU control apparatus according to the first embodiment is explained with reference to FIG. 6. FIG. 6 is a flowchart of the process performed by the LRU control apparatus according to the first embodiment. As shown in FIG. 6, when a user or the like requests an access to predetermined data (YES at step S601), the LRU-candidate selecting unit 13b of the LRU control apparatus 10 reads the LRU information from the LRU-information storage unit 12a (step S602).

When the LRU information needs to be updated (YES at step S603), the LRU-information update unit 13d updates the LRU information (step S604). More specifically, for example, when the LRU information includes identification information (for example, ID) of the entry 2 that stores data corresponding to the access request, the LRU-information update unit 13d extracts the identification information of the entry (for example, information expressed as one of hexadecimal numbers from 0 to F, see FIG. 4) corresponding to the entry 2 from the 2nd storage position in an arbitrary index (for example, Z) of the LRU information stored in the LRU-information storage unit 12a. The LRU-information update unit 13d then successively shifts data (for example, IDs of the entries) stored in the 3rd to 16th storage positions in the index of the LRU information to the left, and stores the identification information of the entry corresponding to the entry 2 extracted from the 2nd storage position to the emptied 16th storage position, thereby updating the LRU information (see FIGS. 5(a) and 5(b)).

On the other hand, when the LRU information does not need to be updated (that is, when the LRU information does not include identification information (for example, ID) of an entry that stores data corresponding to the access request) (NO at step S603), the LRU-candidate selecting unit 13b selects an entry having the oldest last use time from the LRU information as a candidate for the LRU control (step S605). The LRU-candidate selecting unit 13b then outputs the identification information of the entry selected as the candidate for the LRU control to an external module, for example via the input/output controller 11 (step S606).

As described above, the LRU control apparatus according to the first embodiment arranges and stores therein identification information identifying each of plural entries (for example, IDs each uniquely assigned to each entry) as the LRU information in order of last use time starting from one having the oldest last use time. When any of the entries is used, the LRU control apparatus extracts identification information of the used entry from the stored identification information, and moves the extracted identification information to the rearmost position to update the LRU information. The LRU control apparatus then selects a candidate for the LRU control from the entries by referring to the stored LRU information. Accordingly, the LRU control apparatus can reduce the number of bits required for the LRU control when the number of target entries is large, and can achieve complete LRU control.

In the first embodiment, the LRU control apparatus that refers to the LRU information to select a candidate for the LRU control is explained; however, the present invention is not limited thereto. An LRU control apparatus can store therein information indicating whether an entry is selectable as a candidate for the LRU control in association with each of the entries, and select a selectable entry from the LRU information as a candidate for the LRU control. An LRU control apparatus according to a second embodiment that selects a selectable entry from the LRU information as a candidate for the LRU control is explained below.

A configuration of the LRU control apparatus according to the second embodiment and a flow of a process performed thereby are explained first, and then an effect of the second embodiment is explained.

A configuration of the LRU control apparatus according to the second embodiment is explained with reference to FIG. 7. The LRU control apparatus according to the second embodiment has basically the same configuration as that of the LRU control apparatus according to the first embodiment. The LRU control apparatus according to the second embodiment is different in the following point.

A selectability-information storage unit 22b of an LRU control apparatus 20 according to the second embodiment is a storage unit that stores information indicating whether an entry can be selected from LRU information stored in an LRU-information storage unit 22a as a candidate for the LRU control. As shown in FIG. 8, for example, the selectability-information storage unit 22b is adapted to store information indicating that an entry is selectable as the candidate (for example, 0), and information indicating that an entry is unselectable as the candidate (for example, 1). Here, the selectability-information is related to an ID (for example, one of hexadecimal numbers from 0 to F) of each entry.

An LRU-candidate secondary selecting unit 23c of the LRU control apparatus 20 determines whether the candidate for the LRU control, selected by an LRU-candidate selecting unit 23b, is selectable. More specifically, the LRU-candidate secondary selecting unit 23c reads the selectability information from the selectability-information storage unit 22b, determines whether an entry selected by the LRU-candidate selecting unit 23b is selectable as the candidate for the LRU control, and outputs a result of the determination to the LRU-candidate selecting unit 23b.

When the determination result indicating that the selected entry is selectable as the candidate is received from the LRU-candidate secondary selecting unit 23c, the LRU-candidate selecting unit 23b of the LRU control apparatus 20 eventually selects the selected entry as the candidate for the LRU control. On the other hand, when the determination result indicating that the selected entry is unselectable as the candidate is received, the LRU-candidate selecting unit 23b selects another entry as a new candidate from the read LRU information. More specifically, for example, when an entry C stored in the 1st storage position shown in FIG. 4 is unselectable as the candidate, the LRU-candidate selecting unit 23b selects the entry 2 stored in the 2nd storage position as a new candidate for the LRU control.

Figure 9:
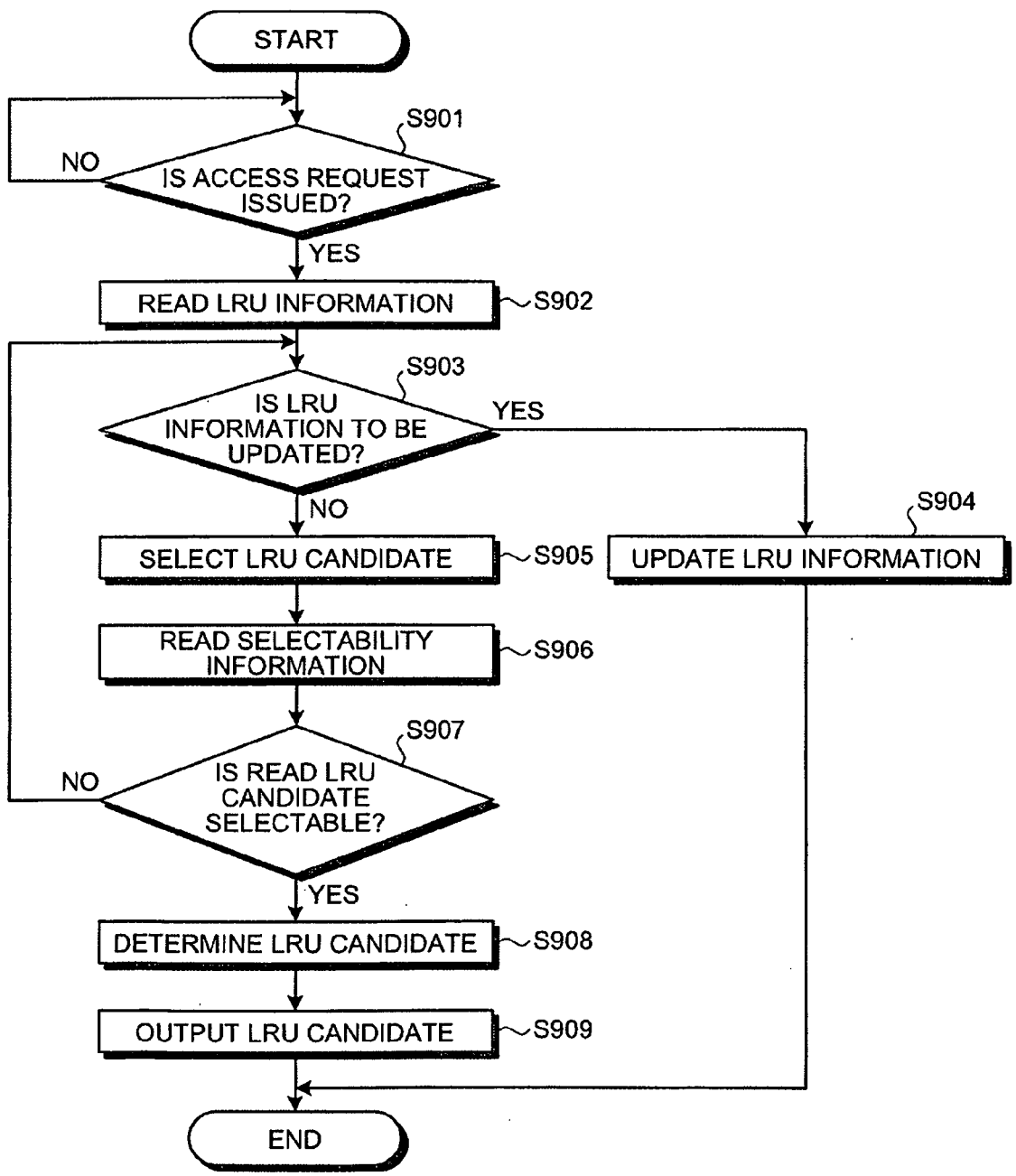
FIG. 9 is a flowchart of a process performed by the LRU control apparatus according to the second embodiment.

A Process performed by the LRU control apparatus according to the second embodiment is explained with reference to FIG. 9. FIG. 9 is a flowchart of a process performed by the LRU control apparatus according to the second embodiment. As shown in FIG. 9, when a user or the like issues a read access request for predetermined data (YES at step S901), the LRU-candidate selecting unit 23b of the LRU control apparatus 20 reads the LRU information from the LRU-information storage unit 22a (step 902).

When the LRU information is to be updated (that is, when the LRU information includes identification information (for example, ID) of an entry that stores data corresponding to the access request) (Yes at step S903), the LRU-information update unit 23d updates the LRU information in the same manner as described in the first embodiment (step S904).

On the other hand, when the LRU information is not to be updated (that is, when the LRU information does not include identification information (for example, ID) of an entry that stores data corresponding to the access request) (NO at step S903), the LRU-candidate selecting unit 23b selects an entry having the oldest last use time from the LRU information as a candidate for the LRU control (step S905).

The LRU-candidate secondary selecting unit 23c then reads the selectability information (step S906). Upon reading of the selectability information, the LRU-candidate secondary selecting unit 23c determines whether the entry selected by the LRU-candidate selecting unit 23b is selectable as the candidate for the LRU control (step S907). When a result of the determination indicates that the selected entry is selectable as the candidate (YES at step S907), the LRU-candidate selecting unit 23b eventually selects the selected entry as the candidate for the LRU control (step S908). Then, the LRU-candidate selecting unit 23b outputs the entry eventually selected as the candidate for the LRU control to an external module, for example via the input/output controller 11 (step S909).

Returning to the explanation of step S907, when the result of the determination performed by the LRU-candidate secondary selecting unit 23c indicates that the entry selected by the LRU-candidate selecting unit 23b is unselectable as the candidate for the LRU control (NO at step S907), the processes from step S905 to step S907 are repeated until the LRU control candidate is eventually selected.

As described above, the LRU control apparatus according to the second embodiment stores therein, as the selectability information, information indicating whether an entry is selectable as a candidate for the LRU control. Here, the information is related to identification information of each entry. The LRU control apparatus further refers to the stored selectability information to select a candidate for the LRU control from selectable entries. Therefore, it is possible to prevent biased results of the LRU control in some ways of selecting unusable entries, thereby achieving complete LRU control.

Further, in the second embodiment, when the information read from the LRU-information storage unit 22a by the LRU-candidate selecting unit 23b includes a reference error (for example, when an error such that inconsistent information is read as the LRU information occurs), the LRU-candidate secondary selecting unit 23c can select any of the selectable entries from the selectability information.

As shown in FIG. 12, for example, when information read from the LRU-information storage unit 22a by the LRU-candidate selecting unit 23b includes a reference error (the entry IDs such as C, 6, and F that are supposed to be uniquely assigned to entries are read several times) so that all entries in the read LRU information are unselectable as a candidate for the LRU control with reference to the selectability information shown in FIG. 8 for example, the LRU-candidate secondary selecting unit 23c selects any of the selectable entries from the selectability information (for example, 2, 3, or 4).

Accordingly, when all of the stored identification information is related to the information indicating that the entry is unselectable (for example, when an error such that inconsistent information is read as the LRU information occurs), the LRU control apparatus according to the second embodiment selects any of entries related to the information indicating that the entry is selectable, as the candidate for the LRU control. Therefore, the LRU control apparatus can address reference errors in the LRU information, which are more likely to occur when the LRU information is configured by using a RAM, than when the LRU information is configured by using a flip-flop or a latch. Accordingly, complete LRU control independent from devices can be achieved.

While embodiments of the present invention have been explained above, the present invention can be embodied in various different forms other than the above embodiments. Thus, other embodiments of the present invention are explained below.

Figure 13:
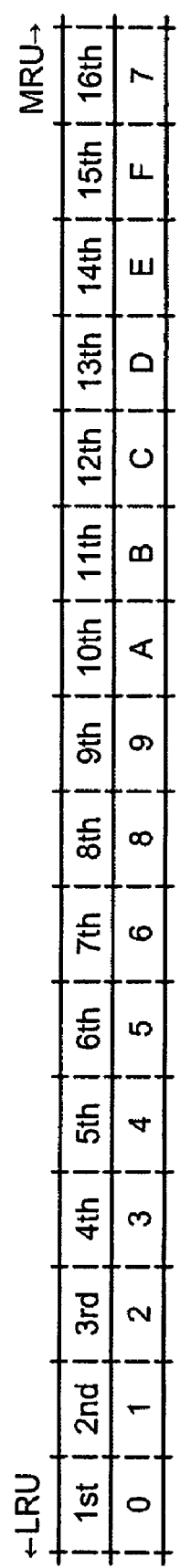
FIG. 13 is an example of consistent information generated by an LRU-information update unit.

In the second embodiment, when the LRU information read from the LRU-information storage unit 22a by the LRU-candidate selecting unit 23b includes a reference error (for example, an error such that inconsistent information is read as the LRU information occurs), the LRU-candidate secondary selecting unit 23c selects any of selectable entries from the selectability information. The present invention is, however, not limited thereto. The identification information (for example, IDs) of entries in the LRU information can be updated with identification information of selectable entries. An example in which the identification information of entries in the LRU information is updated is explained below with reference to FIGS. 10, 11, and 13.

Figure 10:
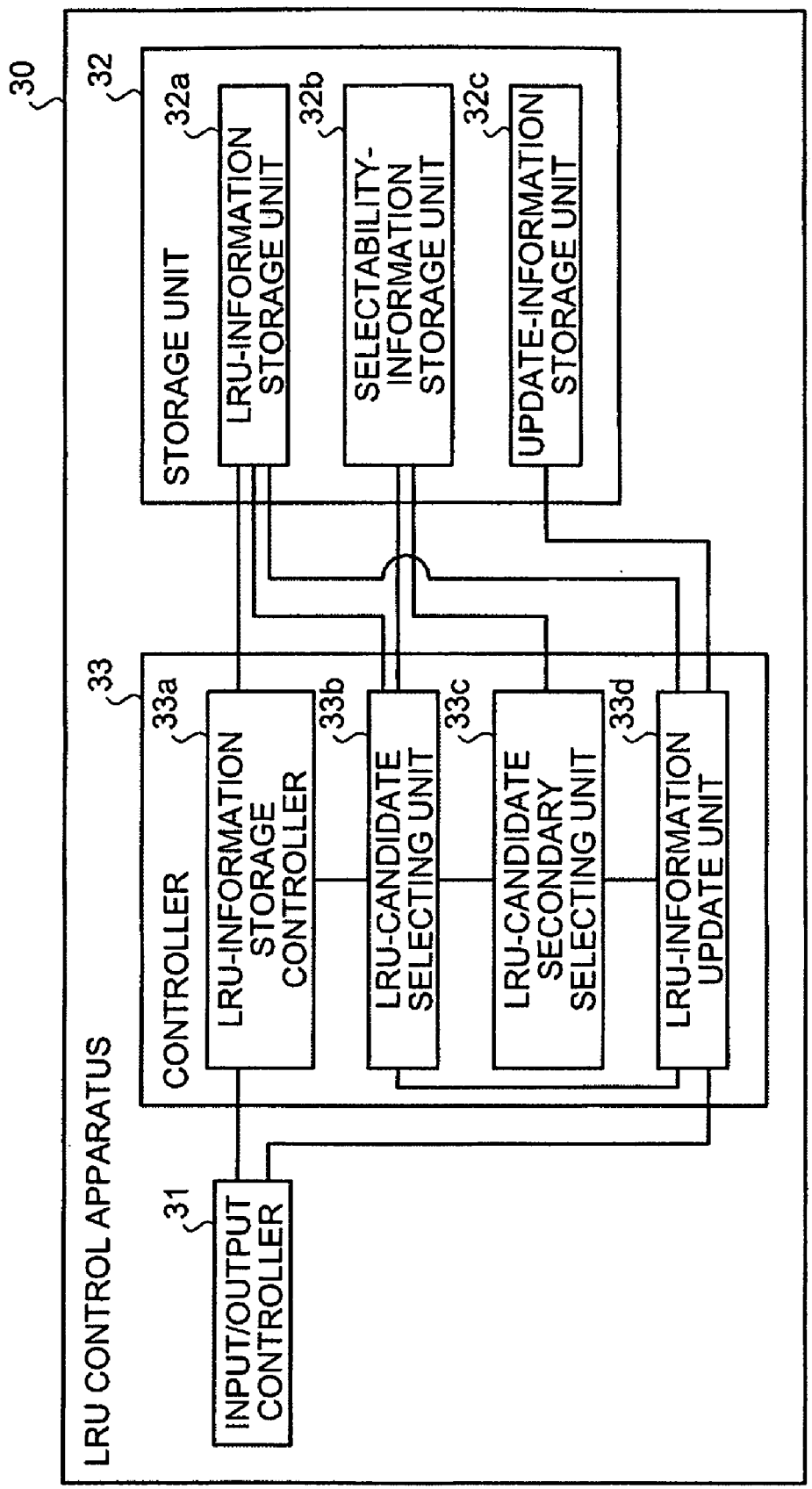
FIG. 10 is a block diagram of a configuration of an LRU control apparatus according to a third embodiment.
Figure 11:
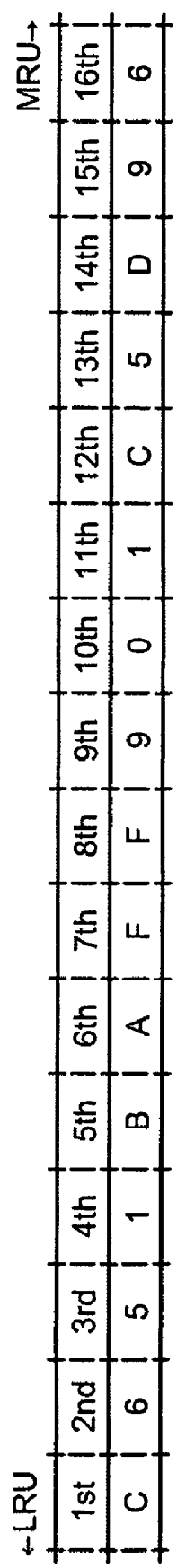
FIG. 11 is an example of erroneous LRU information.

As shown in FIG. 10, an LRU control apparatus 30 has basically the same configuration as that of the LRU control apparatus that is explained in the first or second embodiment. The LRU control apparatus 30 is different in an update-information storage unit 32c, an LRU-candidate selecting unit 33b, and an LRU-information update unit 33d, which are explained below.

The update-information storage unit 32c of the LRU control apparatus 30 stores update information to be used by the LRU-information update unit 33d. For example, the update-information storage unit 32c is adapted to store information including selectable entries (for example, consistent information such as an initial pattern including all entry IDs), as information for updating data in the LRU information including a reference error.

The LRU-candidate selecting unit 33b of the LRU control apparatus 30 determines a reference error when the LRU information read from an LRU-information storage unit 32a does not include all entry IDs (for example, see FIG. 11), and outputs a signal indicating the reference error to the LRU-information update unit 33d.

Upon receipt of the signal indicating the reference error from the LRU-candidate selecting unit 33b, an LRU-information update unit 33d of the LRU control apparatus 30 reads the update information from the update-information storage unit 32c. For example, when the LRU information associated with use of an entry 7 needs to be updated, the LRU-information update unit 33d generates consistent information reflecting the update (see FIG. 13), and writes the generated information in the LRU-information storage unit 32a to update data in the LRU information.

Accordingly, the LRU control apparatus 30 updates the LRU information with identification information (for example, initial pattern) of selectable entries when all of stored identification information is related to information indicating that the entry is unselectable, respectively (for example, when an error such that inconsistent information is read as the LRU information occurs). Therefore, the LRU information can be correctly updated, so that a situation in which an entry cannot be selected upon the next reading can be prevented, which enables complete LRU control.

Figure 7:
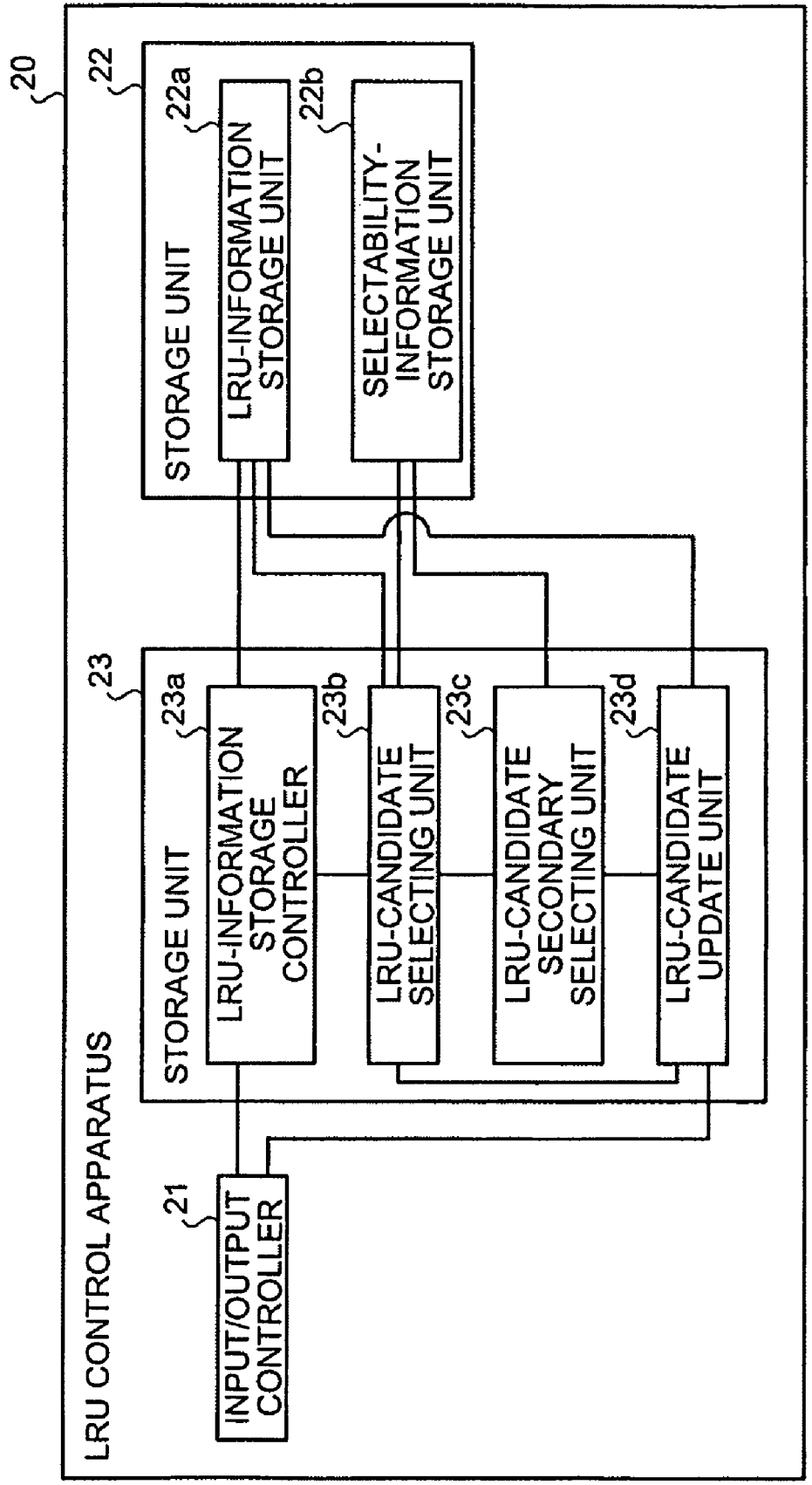
FIG. 7 is a block diagram of a configuration of an LRU control apparatus according to a second embodiment.

FIGS. 2, 7, and 10 depict functional concepts of the constituent elements of each of the LRU control apparatuses, and each of the LRU control apparatuses does not necessarily need to be physically configured as shown in FIGS. 2, 7, and 10. That is, specific forms of distribution or integration of the constituent elements in the LRU control apparatuses are not limited to those shown in FIGS. 2, 7, and 10. For example, the LRU-information storage controller 13a and the LRU-candidate selecting unit 13b of the LRU control apparatus 10 can be integrated, the LRU-candidate selecting unit 23b and the LRU-candidate secondary selecting unit 23c of the LRU control apparatus 20 can be integrated, or the LRU-information storage unit 32a and a selectability-information storage unit 32b of the LRU control apparatus 30 can be integrated. In this way, all or part of the constituent elements can be functionally or physically distributed or integrated in an optional unit, according to various kinds of load and the status of use. In addition, all or an optional part of processing functions performed by each of the LRU control apparatuses can be realized by a CPU and a program analyzed or executed by the CPU, or realized as hardware by wired logic.

Among the respective processes explained in the present embodiment, all or a part of the process explained as being performed automatically can be performed manually, or all or a part of the process explained as being performed manually can be performed automatically in a known method. Information including the process procedures, control procedures, specific names, and various kinds of data and parameters shown in the specification or in the accompanying drawings can be optionally changed, unless otherwise specified.

Figure 14:
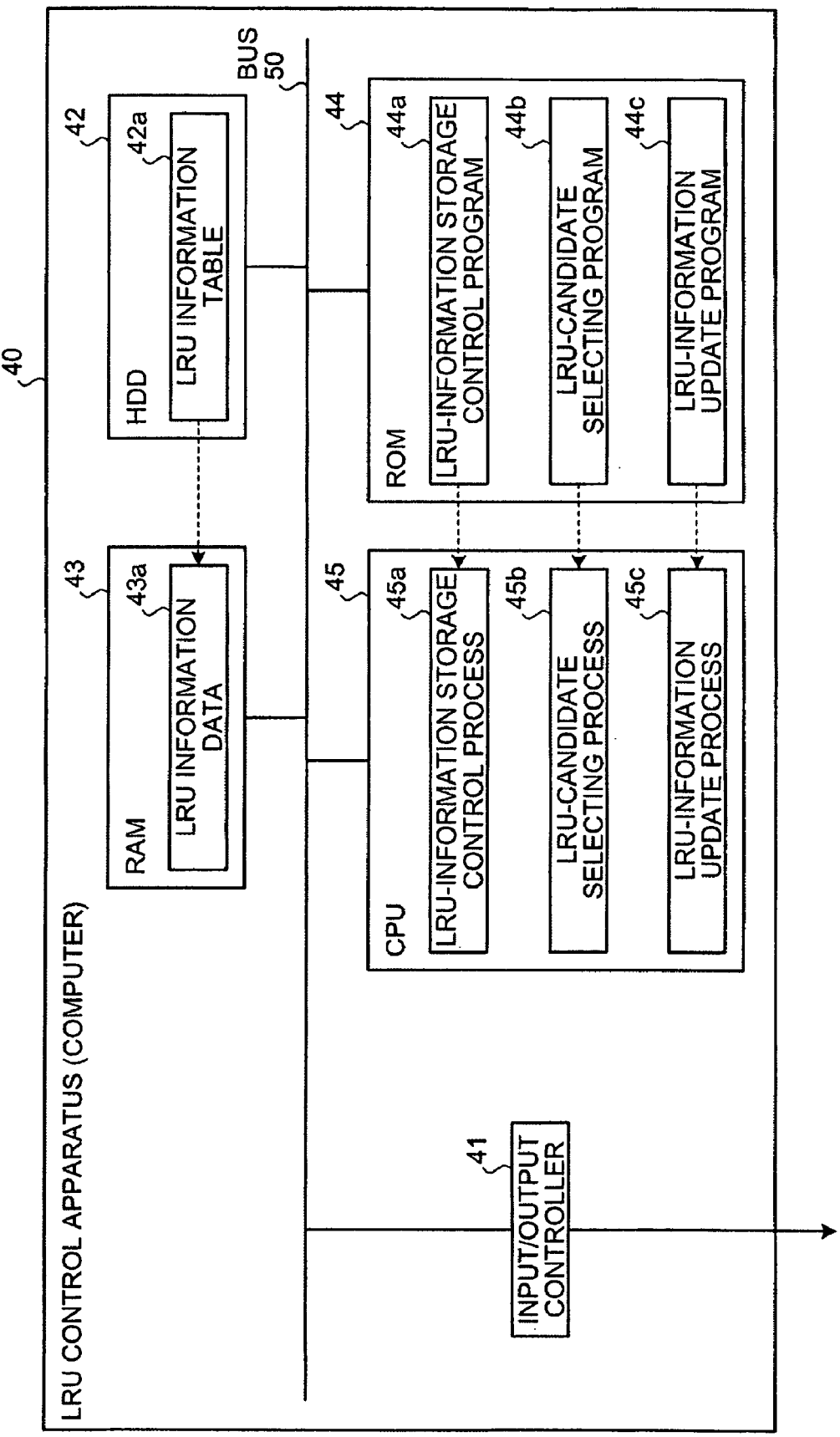
FIG. 14 depicts a computer that executes an LRU control program.

The processes according to the embodiments as explained above can be realized by prepared programs that are executed by a computer system such as a personal computer and a workstation. An example of a computer that executes an LRU control program having the same function as the process (LRU control process) performed by the LRU control apparatus 10 according to the first embodiment is explained below with reference to FIG. 14. FIG. 14 depicts a computer that executes an LRU control program.

As shown in FIG. 14, a computer 40 as an LRU control apparatus includes an input/output controller 41, a HDD 42, a RAM 43, a ROM 44, and a CPU 45, which are connected via a predetermined bus 50. The input/output controller 41 corresponds to the input/output controller 11 shown in FIG. 2.

Further, the ROM 44 previously stores therein an LRU control program having the same function as that of the LRU control apparatus 10 according to the first embodiment, that is, an LRU-information storage control program 44a, an LRU-candidate selecting program 44b, and an LRU-information update program 44c as shown in FIG. 14. These programs 44a, 44b, and 44c can be properly integrated or distributed, like the constituent elements of the LRU control apparatus 10 shown in FIG. 2.

The CPU 45 then reads these programs 44a, 44b, and 44c from the ROM 44 and executes the read programs so that the program 44a, 44b, and 44c serve as an LRU-information storage control process 45a, an LRU-candidate selecting process 45b, and an LRU-information update process 45c, respectively, as shown in FIG. 14. The processes 45a, 45b, and 45c correspond to the LRU-information storage controller 13a, the LRU-candidate selecting unit 13b, and the LRU-information update unit 13d of the LRU control apparatus 10 shown in FIG. 2, respectively.

Further, as shown in FIG. 14, the HDD 42 includes an LRU information table 42a. The LRU information table 42a corresponds to the LRU-information storage unit 12a of the LRU control apparatus 10 shown in FIG. 2. The CPU 45 reads LRU information data 43a from the LRU information table 42a to store the LRU information data 43a in the RAM 43, and performs the LRU control based on the LRU information data 43a stored in the RAM 43.

The programs 44a, 44b, and 44c do not necessarily be stored in the ROM 44 from the start. For example, the programs 44a, 44b, and 44c can be stored in a "portable physical media" to be inserted into the computer 40 such as a flexible disk (FD), a CD-ROM, an MO disk, a DVD, a magneto-optical disk, and an IC card, a "fixed physical media" provided inside or outside the computer 40 such as a HDD, or "another computer (or server)" that is connected to the computer 40 via a public line, the Internet, a local area network (LAN), or a wide area network (WAN). In such a case, the computer 40 can read the programs therefrom, and execute the programs.

According to an embodiment of the invention, identification information identifying each of plural entries (for example, an ID uniquely assigned to each entry) is arrange in order of last use time beginning from one having the oldest last use time, and the each of arranged plural entries is stored as LRU information. When any of the entries is used, identification information of the used entry is extracted from the stored identification information, and moved to a rearmost position to update the LRU information. Then, a candidate to be subjected to LRU control is selected from the entries by referring to the stored LRU information. Therefore, the number of bits required for the LRU control when the number of target entries is large can be reduced, and complete LRU control can be achieved.

Further, according to an embodiment of the invention, an LRU control apparatus stores, as selectability information, information indicating selectability as a candidate to be subjected to the LRU control. Here, the selectability information is related to each of the identification information of the entries. Further, the LRU control apparatus selects the candidate to be subjected to the LRU control from selectable entries by further referring to the selectability information stored in the selectability-information storage unit. Therefore, the LRU control apparatus can prevent biased results of the LRU control in some ways of selecting unusable entries, thereby achieving complete LRU control.

Further, according to an embodiment of the invention, when all of the each of the stored identification information is related to each information indicating unselectability as the candidate (for example, when an error occurs such that inconsistent information is read as the LRU information), the LRU control apparatus selects any of entries that are related to information indicating selectable as the candidate for the LRU control. Therefore, the LRU control apparatus can address reference errors in the LRU information, which are more likely to occur when the LRU information is configured by using a RAM, than when the LRU information is configured by using a flip-flop or a latch, which enables complete LRU control independent from devices.

Further, according to an embodiment of the invention, when all of the each the stored identification information is related to each information indicating unselectable as the candidate (for example, when an error occurs such that inconsistent information is read as the LRU information), the LRU control apparatus updates the LRU information with identification information (for example, an initial pattern) of selectable entries. Therefore, the LRU information is correctly updated, which prevents a situation in which an entry cannot be selected upon the next reading, and enables complete LRU control.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An LRU control apparatus for selecting an entry to be subjected to an LRU control from plural entries provided in a storage device, the LRU control apparatus comprising:
   an LRU-information storage unit that arranges identification information identifying each of the entries in order of last use time beginning from an entry having an oldest last use time, and stores the arranged identification information as LRU information;
   a selectability-information storage unit that stores selectability information that is related to each of the identification information of the entries and indicates selectability as a candidate to be subjected to the LRU control;
   an LRU-information update unit that extracts identification information of the used entry from the identification information stored in the LRU-information storage unit and updates the LRU information by moving the identification information of the used entry to a rearmost entry when any of the entries is used, and that updates the LRU information with identification information of selectable entries when all of the identification information stored in the LRU-information storage unit is related to each information indicating unselectable as the candidate in the selectability-information storage unit; and
   an LRU-control-candidate selecting unit that selects a candidate to be subjected to the LRU control from the entries by referring to the LRU information stored in the LRU-information storage unit and the selectability information stored in the selectability-information storage unit.

2. The LRU control apparatus according to claim 1, wherein when all of the each of the identification information stored in the LRU-information storage unit is related to each information indicating unselectable as the candidate in the selectability-information storage unit, the LRU-control-candidate selecting unit selects, as the candidate to be subjected to the LRU control, any of entries that is related to information indicating selectable as the candidate in the selectability-information storage unit.

3. A non-transitory computer readable medium including programmed instructions for controlling an LRU control apparatus that includes an LRU-information storage unit that arranges identification information identifying each of the entries in order of last use time beginning from an entry having an oldest last use time, and stores the arranged identification information as LRU information and a selectability-information storage unit that stores selectability information that is related to each of the identification information of the entries and indicates selectability as a candidate to be subjected to the LRU control, and selects an entry to be subjected to an LRU control from plural entries provided in a storage device, wherein when the instructions executed by a computer, causes the computer to perform:
   extracting identification information of the used entry from the identification information stored in the LRU-information storage unit, and updating the LRU information by moving the identification information of the used entry to a rearmost entry when any of the entries is used;
   updating the LRU information with identification information of selectable entries when all of the identification information stored in the LRU-information storage unit is related to each information indicating unselectable as the candidate in the selectability-information storage unit; and
   selecting a candidate to be subjected to the LRU control from the entries by referring to the LRU information stored in the LRU-information storage unit and the selectability information stored in the selectability-information storage unit.

4. An LRU control method for controlling an LRU control apparatus that includes an LRU-information storage unit that arranges identification information identifying each of the entries in order of last use time beginning from an entry having an oldest last use time, and stores the arranged identification information as LRU information and a selectability-information storage unit that stores selectability information that is related to each of the identification information of the entries and indicates selectability as a candidate to be subjected to the LRU control, and selects an entry to be subjected to an LRU control from plural entries provided in a storage device, the LRU control method comprising:
   extracting identification information of the used entry from the identification information stored in the LRU-information storage unit, and updating the LRU information by moving the identification information of the used entry to a rearmost entry when any of the entries is used;
   updating the LRU information with identification information of selectable entries when all of the identification information stored in the LRU-information storage unit is related to each information indicating unselectable as the candidate in the selectability-information storage unit; and
   selecting a candidate to be subjected to the LRU control from the entries by referring to the LRU information in the LRU-information storage unit and the selectability information stored in the selectability-information storage unit.

* * * * *